Sept. 19, 1961 L. B. SCHWEIGER 3,000,791
SPORE CULTIVATION
Filed March 25, 1958
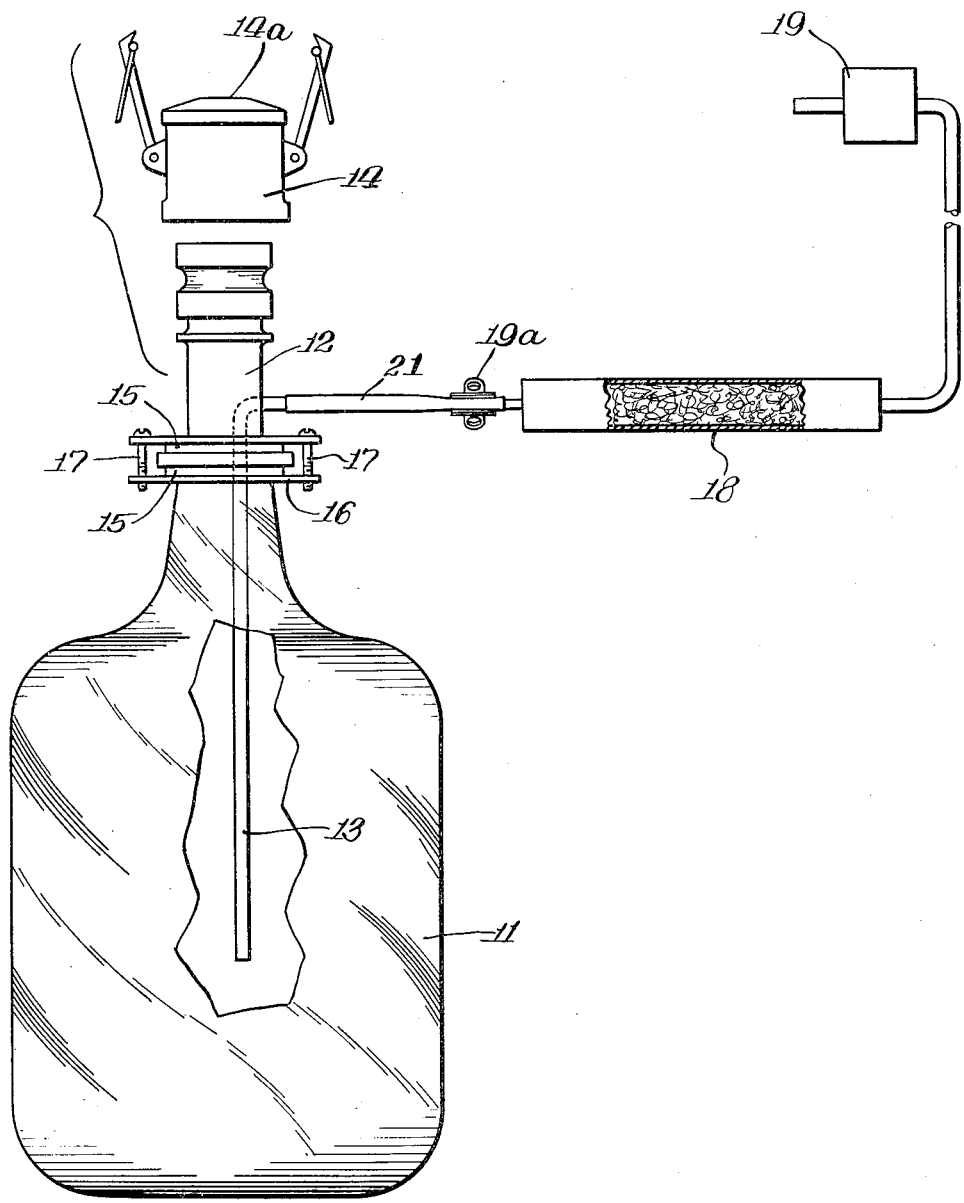
INVENTOR.
Leonard B. Schweiger,
BY
Brown, Jackson, Boettcher & Dienner
Attys.

United States Patent Office 3,000,791
Patented Sept. 19, 1961

3,000,791
SPORE CULTIVATION
Leonard B. Schweiger, Elkhart, Ind., assignor to Miles Laboratories, Inc., Elkhart, Ind., a corporation of Indiana
Filed Mar. 25, 1958, Ser. No. 723,906
3 Claims. (Cl. 195—36)

This invention relates to the cultivation of *Aspergillus niger* spores.

More particularly it relates to the production of *Aspergillus niger* spores which are characterized by their improved propensity for increasing the yield and production rate of citric acid when used as the fermentative organism in the fermentation of carbohydrate-containing materials.

While it has been recognized, as for example in U.S. Patent No. 2,492,667, that the production of citric acid by fermentation of carbohydrate-containing materials using *Aspergillus niger* is dependent upon the development of a proper cellular metabolism of the fermentative organism and that this metabolism is greatly influenced by the medium on which the spores have been cultivated, the problem of consistently obtaining economically attractive yields of *Aspergillus niger* spores having the right kind and degree of physiological activity has up to the present time, not been satisfactorily solved.

Thus, though it is possible to obtain good physiologically active spores of *Aspergillus niger* by growing them on synthetic media, the spore yield is uneconomically meager. The use, as sporulating media, of non-synthetic material, such as wheat bran, puffed rice, polished rice and beet pulp, results in an abundance of spores which, however, have low activity insofar as citric acid production is concerned. Some of the other non-synthetic materials have presented a contamination problem which made it extremely difficult to carry out an aseptic spore-propagation procedure.

In accordance with the present process, it has been discovered that, corn bran, i.e., the product represented by the fraction of corn which contains largely hulls or pericarp of corn kernel as obtained by dry milling, when wetted with distilled water, sterilized, inoculated with a suspension of *Aspergillus niger* spores grown on agar slants and aerated for a period of, for example, about seven to fourteen days resulted in the production of crops of spores in excellent yield with all the desired characteristics for citric acid fermentation. These spores, when used as the inoculum in a citric acid fermentation such as described in U.S. Patent No. 2,492,667, resulted in acid production rates and yields which were significantly better than those obtained with spores developed on other media.

My invention will be fully illustrated in the following described detailed procedure for the cultivation of *Aspergillus niger* spores, taken in conjunction with the drawing, in which there is illustrated a five gallon Pyrex carboy 11, fitted at the mouth in known manner with an aluminum tube 12, serving as an exhaust air outlet. An air inlet tube 13, conveniently of glass or the like is attached to the aluminum tube 12, and projects into the carboy 11, about three-quarters of its depth, to prevent contamination. The exhaust air outlet tube 12 is covered with a conventional snap cap 14, which contains a thick filter paper pad 14a to prevent contamination.

Exhaust air outlet tube 12, is maintained in close-fitting air-tight connection with the carboy 11, by means of rubber gaskets 15 and a ring clamp 16, suitably of aluminum or the like, secured together by screws 17 as shown. A cotton air filter 18 connects the air inlet tube 13 and air flow meter 19 by suitable tubing. A rubber tube 21 connects the air inlet tube 13 and the cotton air filter 18, and air flow may be shut off by means of a pinch clamp 19a on tube 21.

In use, twelve-hundred grams of corn bran are placed in the five gallon Pyrex carboy 11, to which is added 1 liter of distilled or otherwise deionized water, and the carboy shaken to moisten all the bran. While the precise amount of water added at this point is not particularly critical, a large excess of water is undesirable since it causes growth of the mycelium to such an extent that the bran may become matted, and clots form. This reduces spore production and increases difficulty in emptying carboy contents. And if an extremely small amount of water were used it may result in insufficient spore production. About one liter per 1200 grams of bran works quite well.

After the bran is moistened, the air exhaust tube 12 and the air inlet tube 13 are sealed through the use of the snap cap 14 and the pinch clamp 19a on tube 21, respectively. The carboy 11 is then placed in an autoclave and maintained there at 20 p.s.i. steam pressure for one and one-half to two hours. The carboy is then removed from the autoclave, cooled to somewhat below 50° C. and shaken well to break up all clumps of corn bran prior to the inoculation step which follows.

Spores from 1 or 2 agar slants propagated on the slants in accordance with the technique described in U.S. Patent No. 2,492,667, are suspended in approximately 200 ml. of sterile distilled water containing a small amount of a wetting agent such as Tween 80 or 81, to effect rapid and thorough wetting of the bran and spores. Tween 80 is a trade name for sorbitan monooleate in the form of an oily solid, having a specific gravity of 1.05–1.10; Tween 81 is a trade name for sorbitan monooleate in the form of an oily liquid, having a specific gravity of 1.00–1.05. The entire suspension is transferred to the carboy, care being taken to insure maintenance of strict aseptic conditions. The carboy may then be placed on a rack, the air line connected, and aeration maintained at a rate of 3 liters per minute. The carboys are rotated, for example, once a day, through the entire incubation period which may take from about seven to fourteen days to achieve maximum spore yield.

Spores will begin to develop at approximately twenty-four to thirty hours. During the first four or five days considerable heat is generated by the growing mycelium in the bran, although heat production will decrease as the spore crop increases. A sufficient spore crop may develop in seven days, although it may be advisable to continue the incubation for as much as seven additional days to obtain the maximum number of spores. During this time, the temperature of the incubation room, and the air, is preferably held between about 28° C. and 30° C.

After appropriate incubation, the air line is disconnected at the carboy filter, approximately twelve liters of sterile distilled water containing about 10 ml. of a wetting agent such as Tween 80 or 81 are added to the carboy 11 through the air outlet tube 12, and the carboy is shaken vigorously to break up any large clumps of bran and mycelium, after which the product is ready for addition to the fermenter.

The unexpectedly superior citric acid-producing properties of spores grown in accordance with my invention were demonstrated by means of a side-by-side comparison of performance characteristics of such spores with spores grown on other media. In these comparative tests, fermentations were conducted according to the procedure given in U.S. Patent No. 2,476,159. Cellular morphology used as a convenient means of control, was determined by macro- and microscopic examination, and citric acid was calculated as the monohydrate, by titration with 0.1 N sodium hydroxide.

The inoculum used in these comparative tests consisted of spore suspensions of *Aspergillus niger* produced on corn bran, wheat bran, rye grains, Sabouraud's agar slants, polished rice, beet pulp, and the prepared dry breakfast cereals sold under the trade names of Puffed Wheat, Kix, and Cheerios. The spores were separated from the sporulation medium through the use of sieves on a shaker, except that spores which were developed on corn bran and wheat bran were not separated from the bran, but used as a spore-bran suspension. The amounts of spores used were based upon a standard prepared by washing the spores off two agar slants and diluting the suspension to 100 ml. Five ml. of this suspension was used as a standard inoculum for 4000 ml. of media. Except for spores produced on corn bran and wheat bran, spore suspensions were made up to the same density as the standard inoculum. Corn bran plus spores and wheat bran plus spores were each made up into suspensions which contained 50 mg. of solids per ml. The standard was approximated by using 1.5 ml. of the spore-bran suspension per 4000 ml. of the media Table I below shows the comparative effectiveness of a number of substrates with respect to size of resulting spore crop, ease of sterilization of spore crop, cost and availability of substrate, and physiological (citric-acid producing) activity.

TABLE I

*Some general observations of sporulation substrates*

| Sporulation Substrate | Spore Crop | Sterilization | Cost and Availability | Physiological Activity |
|---|---|---|---|---|
| Sabouraud's agar. | Moderate. | Complete. | High cost available. | Very good. |
| Rye grain. | Excellent. | Lengthy and difficult. | Low cost readily available. | Do. |
| Beet pulp. | Good. | Complete. | Low cost available. | Very poor. |
| Rice. | ---do--- | ---do--- | ---do--- | Poor. |
| Kix. | ---do--- | ---do--- | High cost available. | Very poor. |
| Cheerios. | ---do--- | ---do--- | ---do--- | Do. |
| Puffed Wheat. | ---do--- | ---do--- | ---do--- | Erratic. |
| Wheat Bran. | Excellent. | ---do--- | Low cost readily available. | Do. |
| Corn bran. | ---do--- | ---do--- | ---do--- | Very good. |

With respect to Table I, it is pointed out that while Sabouraud's agar is generally a good substrate for laboratory tests where quantitative duplication of results are important, its use as a sporulation medium for large scale production is generally prohibitive because of the high cost of the agar, and the time and labor which is required for harvesting the spore crops.

Rye grain is cheap, readily available and was found to produce especially good crops of spores. However, the spore harvest procedure is somewhat difficult in that the spores must be separated from the grain prior to preparing a suspension for inoculation. The further disadvantage lies in the fact that the time and temperature required for sterilization also chars the grain which then results in an uneconomical crop of spores.

Beet pulp, rice, Kix, Cheerios, Puffed Wheat and wheat bran likewise did not meet the necessary practical requirements of a commercially satisfactory substrate either because of high cost, poor or erratic physiological activity, or both.

Corn bran, on the other hand, met all of the requirements in that luxuriant spore crops were produced that developed into high acid-producing mycelium. Corn bran is cheap, readily available, can be sterilized rapidly and completely, and the spores do not have to be separated from the bran prior to the inoculation of a fermentation.

In determining the citric acid-producing activity of mycelia produced from spores from the various sporulation media listed in Table I those spores were used as inocula for fermenting media whose carbohydrate content was composed of refined corn sugar, sucrose and high test molasses. Refined sugars were used because of their low undersirable trace element content. The conditions of the tests were such that any spores that would not develop into good acid-producing mycelium in these fermentation media, would not do so in less purified sugar media.

Table II below shows the citric acid production resulting from inoculation of refined sugars with spore cultures cultivated on various sporulation media, followed by fermentation.

TABLE II

*Evaluation of A. niger spore inocula developed on various sporulation media as determined by citric acid production*

| Sporulation media | Fermentation media | Total acidity g./4L |
|---|---|---|
| Sabouraud's agar | Corn sugar | 359 |
| Rye grain | Corn sugar | 420 |
|  | Sucrose | 399 |
| Corn bran | Corn Sugar | 554 |
|  | Sucrose | 343 |
| Beet pulp | High test molasses | 0 |
| Rice | Corn sugar | 195 |
| Kix (cereal) | ---do--- | 134 |
| Cheerios (cereal) | ---do--- | 0 |
| Puffed Wheat (cereal) | Corn sugar | 0 |
|  | Sucrose | 0 |
| Wheat Bran | High test molasses | 0 |

Of the nine sporulation media studied it is seen that only Sabouraud's agar, rye grain, and corn bran, produced spores that germinated into typical mycelia with the proper cellular metabolism for acid production in the substrates employed.

Rice and Kix produced spores that developed into a borderline type of growth that produced citric acid in quantities far inferior to the Sabouraud's agar.

Beet pulp, wheat bran and the cereals, Cheerios and Puffed Wheat produced spores that germinated into mycelia with the improper cellular metabolism for producing citric acid.

As a further evaluation of the spores developed on corn bran, a comparison was made with spores developed on Sabouraud's agar and spores developed on rye grain, in regard to their ability to produce citric acid from three different substrates:

(1) Decationized No. 70 corn sugar;
(2) Decationized high test molasses;
(3) Refined cane sugar.

The citric acid yields from the various substrates using spores produced on the three sporulation media listed above are shown in Table III below:

TABLE III

*A comparison of inocula grown on Sabouraud's agar rye grain and corn bran as determined by citric acid production from #70 corn sugar, high test molasses and sucrose substrates*

| Inoculum | Fermentation substrate | Conversion of initial carbohydrate to citric acid (percent)[1] |
|---|---|---|
| Spores from Sabouraud's agar. | Decat. corn sugar | 72.2 (2) |
|  | Decat. high test molasses | 67.4 (3) |
|  | Refined cane sugar | 71.4 (4) |
| Spores from rye grain. | Decat. corn sugar | 78.3 (2) |
|  | Decat. high test molasses | 69.2 (2) |
|  | Refined cane sugar | 66.1 (2), 75.2 (1) |
| Spores from corn bran. | Decat. corn sugar | 86.3 (3) |
|  | Decat. high test molasses | 81.0 (4) |
|  | Refined cane sugar | 71.7 (1), 70.1 (2) |

[1] Average conversion. Figures in parenthesis indicate number of fermentations included in average.

The superiority of inocula prepared from spores developed on corn bran over spores produced on rye grain and Sabouraud's agar is clearly shown by a comparison of acid yields obtained from all three substrates.

It was also found that the corn bran spore fermentations were able to tolerate a higher initial sugar content because of more rapid acid production rates, which allowed more sugar to be fermented out of the same fermentation as the rye grain spore fermentations with lower initial sugar levels. It has been found further that the efficiency of citric acid production in fermentations using decationized high test molasses is greatly improved with the use of spore inocula developed on corn bran. And additionally, since spores do not have to be separated from the bran, the present technique permits the whole spore development and inoculation procedure to be carried out under the strictest aseptic conditions, which is highly advantageous.

In summary, the present technique for producing spores of *Aspergillus niger* permits production of a surprisingly great abundance of spores under aseptic conditions. Inoculation of fermentation media with spores produced in accordance with my new technique not only does not require separation of spores from bran, thereby permitting introduction of bran and spores into the fermentation medium together, but also produces a mycelial growth having unexpectedly high citric acid-producing properties.

I claim:

1. A method of preparing inocula for use in the submerged fermentation of citric acid which comprises inoculating sterilized corn bran with spores of *Aspergillus niger* in the presence of sufficient sterile water to wet the bran, and incubating the resulting mixture in the presence of air until a substantial crop of the spores has been produced.

2. A method in accordance with claim 1 wherein said water contains a wetting agent.

3. A method in accordance with claim 1, wherein said incubation takes place in a zone through which sterile air moves.

References Cited in the file of this patent

UNITED STATES PATENTS

| | | |
|---|---|---|
| 1,564,385 | Waksman | Dec. 8, 1925 |
| 2,047,669 | Cahn | July 14, 1936 |
| 2,278,236 | Ayres | Mar. 31, 1942 |
| 2,352,168 | Christensen | June 27, 1944 |
| 2,385,283 | Kane et al. | Sept. 18, 1945 |
| 2,476,159 | Schweiger et al. | July 12, 1949 |

FOREIGN PATENTS

| | | |
|---|---|---|
| 348,214 | Great Britain | May 14, 1931 |

OTHER REFERENCES

Thom et al.: "Manual of the Aspergilli," 1955, published by The Williams & Wilkins Co., Baltimore, Md., pp. 37 and 38.

Lilly et al.: "Physiology of the Fungi," 1951, published by McGraw-Hill Book Co., Inc., New York, pp. 333 and 334.